(12) United States Patent
Henocq et al.

(10) Patent No.: US 8,370,694 B2
(45) Date of Patent: Feb. 5, 2013

(54) METHOD AND DEVICE FOR TRANSMITTING DATA, IN PARTICULAR VIDEO

(75) Inventors: Xavier Henocq, Melesse (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 955 days.

(21) Appl. No.: 12/368,820

(22) Filed: Feb. 10, 2009

(65) Prior Publication Data
US 2009/0210765 A1 Aug. 20, 2009

(30) Foreign Application Priority Data
Feb. 14, 2008 (FR) ...................................... 08 50958

(51) Int. Cl.
*G08C 25/02* (2006.01)
(52) U.S. Cl. ......................................................... 714/748
(58) Field of Classification Search .................. 714/748, 714/749
See application file for complete search history.

(56) References Cited

U.S. PATENT DOCUMENTS

| | | | | |
|---|---|---|---|---|
| 5,896,402 A | * | 4/1999 | Kurobe et al. | 714/748 |
| 6,112,323 A | * | 8/2000 | Meizlik et al. | 714/748 |
| 6,697,983 B1 | * | 2/2004 | Chintada et al. | 714/748 |
| 7,035,258 B2 | * | 4/2006 | Alam et al. | 370/390 |
| 7,426,305 B2 | | 9/2008 | Denoual et al. | |
| 7,484,157 B2 | * | 1/2009 | Park et al. | 714/748 |
| 2003/0009717 A1 | * | 1/2003 | Fukushima et al. | 714/748 |
| 2004/0066742 A1 | * | 4/2004 | Varsa et al. | 370/229 |
| 2005/0111416 A1 | | 5/2005 | Ginzburg | |
| 2005/0114386 A1 | | 5/2005 | Nassor et al. | |
| 2005/0198118 A1 | | 9/2005 | Viger et al. | |
| 2005/0198676 A1 | | 9/2005 | Henocq et al. | |
| 2005/0278389 A1 | | 12/2005 | Maze et al. | |

(Continued)

FOREIGN PATENT DOCUMENTS
WO 2008/059000 5/2008

OTHER PUBLICATIONS

Sze et al. "Network-Driven Layered Multicast with IPv6". Networking 2000 Broadband Communications, High Performance Networking, and Performance of Communication Networks. Jan. 1, 2001.*

(Continued)

*Primary Examiner* — Yolanda L Wilson
(74) *Attorney, Agent, or Firm* — Fitzpatrick, Cella, Harper & Scinto (57) ABSTRACT

A method and device for transmitting data packets from a server to at least one client concerns i) estimating a time lapse between the transmission of a successive first and second packet, on the basis of information relating to the first packet, the information being representative of whether or not the first and second packets transport image data from the same image, and ii) triggering and defining retransmission of the second packet, on the basis of said time lapse. In one embodiment, the client estimates the time lapse on the basis of the type of the second packet and on the basis of statistical results concerning the type of the second packet and requests the retransmission of a packet awaited for a longer time than that time lapse. In another embodiment, the server estimates the time lapse on the basis of the type of payload of a first packet to retransmit and of at least one second packet following the first packet to retransmit and spontaneously retransmits the second packet with the first packet on the basis of that time lapse.

20 Claims, 8 Drawing Sheets

U.S. PATENT DOCUMENTS

| | | |
|---|---|---|
| 2006/0036813 A1 | 2/2006 | Henocq et al. |
| 2006/0107167 A1* | 5/2006 | Jeong et al. .................... 714/748 |
| 2006/0206774 A1* | 9/2006 | Park et al. ..................... 714/749 |
| 2007/0168824 A1* | 7/2007 | Fukushima et al. .......... 714/748 |
| 2007/0245201 A1* | 10/2007 | Sammour et al. ............. 714/748 |
| 2007/0255993 A1* | 11/2007 | Yap et al. ...................... 714/748 |
| 2007/0260956 A1* | 11/2007 | Terry et al. .................... 714/748 |
| 2008/0065945 A1* | 3/2008 | Curcio et al. .................. 714/748 |
| 2008/0084821 A1 | 4/2008 | Maze et al. |
| 2008/0098274 A1* | 4/2008 | Kwon et al. ................... 714/748 |
| 2008/0123560 A1 | 5/2008 | Nassor et al. |
| 2008/0294789 A1 | 11/2008 | Nassor et al. |
| 2009/0097483 A1 | 4/2009 | Henocq et al. |
| 2009/0135818 A1 | 5/2009 | Onno et al. |
| 2009/0300450 A1* | 12/2009 | Tzannes ........................ 714/748 |
| 2010/0118888 A1* | 5/2010 | Picco et al. ................... 370/468 |
| 2011/0161765 A1* | 6/2011 | Oran ............................. 714/748 |

OTHER PUBLICATIONS

Ho-Pong Sze, et al, "Network-Driven Layered Multicast with IPv6", Networking 2000 Broadband Communications, High Performance Networking, and Performance of Communication Networks, Jan., 1, 2001, pp. 11-22. <URL:http://www.springerlink.com/content/0lpyjldxr94krh04/fulltext.pdf>.

French Search Report dated Dec. 1, 2008 issued during prosecution of related French application No. FR0850958.

* cited by examiner

METHOD AND DEVICE FOR TRANSMITTING DATA, IN PARTICULAR VIDEO

BACKGROUND

The present invention concerns a method and device for transmitting data, in particular video data. It concerns, in particular, video data transmission implementing error control by data retransmission.

In the case of video transmission by packets over a network in which the RTP protocol is used (RTP being an acronym for "Real-Time Transport Protocol"), the network is not reliable since it does not provide stable transmission conditions and losses may occur.

In the context of H.264 video coding or SVC (acronym for "Scalable Video Coding"), the video transport unit is the NAL (acronym for "network abstraction layer"). The NAL may be viewed as a container grouping together the video data behind a header which gives a description of those data.

The IETF (acronym for "Internet Engineering Task Force") has defined RTP payloads for transporting AVC NALs (AVC being an acronym for "Advanced Video Coding") as set out, for example, in the paper by S. Wenger et al., "RTP payload format for H.264 video", of February 2005.

This payload format was then extended for SVC as set out, for example, in the paper by S. Wenger et al., "RTP payload format for SVC video" of Jul. 9, 2007. In this context, four types of payload have been defined:
  single NAL unit packet,
  single time aggregation packet, or STAP,
  multiple time aggregation packet, or MTAP,
  fragmented unit packet, or FU.

Single NAL packets have been defined for backward compatibility with prior standards but their use is not recommended. It is assumed, in what follows, that this type of packet is not used. The other types of payload are described with reference to FIG. 1, in which a video data stream 105 is represented in the top line and in the bottom line that video stream is represented encapsulated into packets 110 to 130.

Figure 1:
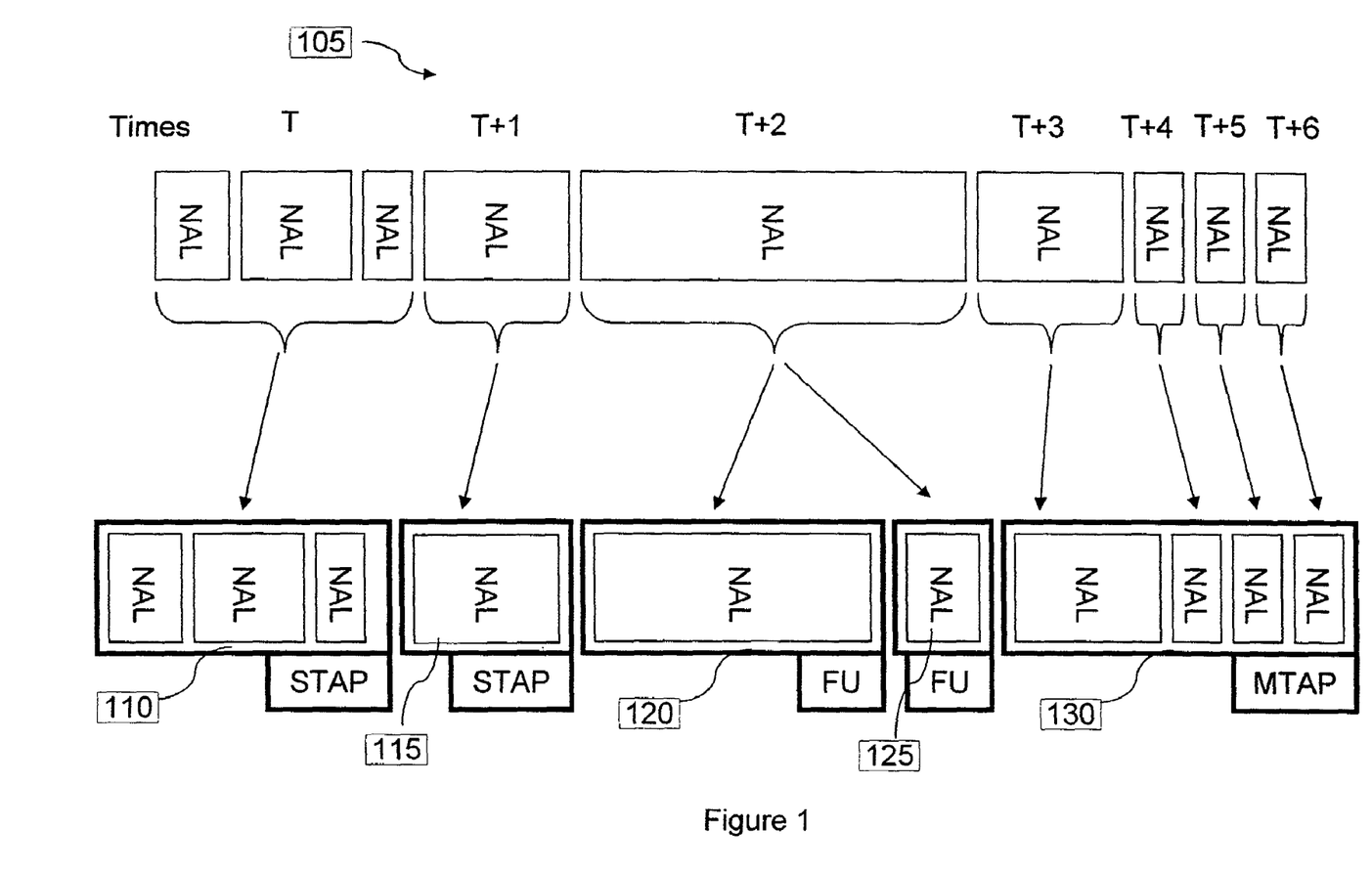
FIG. 1 represents different payload types for video data packets transmitted over a network.

As can be seen, an STAP packet contains one NAL (the case of packet 115) or several NALs (the case of packet 110) which correspond at the same moment, for example to layers, or slices, that is to say portions of the same frame that are independently decodable from each other. An MTAP packet 130 contains several NALs which correspond to different moments. A packet FU 120 or 125 is used to transport NALs which cannot be transported by a single packet, for example due to a packet size limitation. The MTU (acronym for "Maximum Transfer Unit") defines the maximum packet size which ensures that the packet will not be fragmented by the network.

Error control mechanisms based on retransmission are generally grouped together under the name "ARQ" (acronym for "Automatic Repeat Request"). ARQ is a very effective tool for finding lost data. It is based on the detection, at the client, of losses and the transmission of an acknowledgement of receipt, or ACK (abbreviation of "acknowledgement"), or of an acknowledgement of non-receipt, or NACK (abbreviation for "Non ACK"). The server retransmits the non-received data that are the subject of a NACK.

However, this mechanism was designed for applications without time constraints, such as those for file transfer. It is generally accepted that this type of mechanism is too slow for applications which do not allow delay, such as videoconference or very short delays, such as video on demand. The delay induced by ARQ is the combination of two delays. The first depends on the network and it is regarded here as not being possible to reduce. It corresponds to the transmission time lapse of the NACK and to that of the retransmission of the lost packet. The second is linked to the delay in detecting the data loss. When RTP packets are transmitted over the network, a sequential number is inserted into each packet. The successively transmitted packets thus have successive numbers.

The client detects losses when it identifies a gap in the successively received numbers. Thus, when a packet is lost, the client must wait to receive the packet following the one lost in order to detect the loss of the packet. This delay further increases when several successive packets are lost.

Several solutions have been proposed to improve the reactivity of ARQs by reducing this second delay. The document U.S. Pat. No. 7,124,343 describes a server which transmits a packet to a client over a first link and an indicator of transmission of that packet over a second link. When it receives the indicator, the client launches a time measurement with which it estimates the time lapse for arrival of the packet. When the client considers that the packet should already have arrived, it transmits a NACK to the server. However, this solution imposes the use of two links, or channels, which is not always feasible and reduces the bandwidth available for the video data.

The document US 2004 0,013,114 describes client/server applications in which a time slot is allocated to the server to transmit packets. The server retransmits all these packets if it receives a NACK concerning one of these packets. However, this solution also reduces the bandwidth available for the video data.

SUMMARY

The present invention aims to mitigate these drawbacks.

To that end, according to a first aspect, the present invention concerns a method of transmitting data packets from a server to at least one client, that comprises:
  a step of estimating a time lapse between the transmission of a successive first and second packet, on the basis of information relating to the first packet and
  a step of triggering and of defining retransmission of the second packet, on the basis of said time lapse.

By virtue of these provisions, the reactivity of the retransmission is improved, since not only can the client detect the loss of a packet without awaiting the reception of the following packet, but the server can also anticipate the risk of conjoint loss of the packets to transmit and consequently retransmit the packets most liable to be lost further to the loss of a first packet. Moreover, the implementation of the invention makes it possible to adapt the reactivity to the packet type, which reduces the proportion of retransmissions which would be unjustified if account was not taken thereof.

According to particular features, the information relating to the first packet represents a content type of the second packet and, during the step of estimating time lapse, the time lapse between the transmission of the first and of the second packet is estimated on the basis of the content type of the second packet.

According to particular features, the information relating to the first packet represents a content type of the first packet and, during the step of estimating time lapse, the time lapse between the transmission of the first and of the second packets is estimated on the basis of the content type of the first packet.

According to particular features, during the step of estimating time lapse, the time lapse is estimated on the basis of the type of payload of the first packet.

According to particular features, during the step of time lapse estimation, said time lapse is estimated on the basis of the fact of whether or not the first and second packets transport image data from the same image.

According to particular features, said data are video data and the information relating to the first packet represents the fragmentation between at least the first and the second packets of video data corresponding to the same moment in time.

The inventors have, as a matter of fact, determined that all or part of these parameters influences the time lapse between the reception of two packets by the client and/or the risk of conjoint loss of packets transmitted by the server.

According to particular features, during the step of estimating time lapse, the client estimates said time lapse on the basis of the type of the first packet and on the basis of statistical results concerning the time lapse between the reception of the first and the second packets on the basis of the content type of the first packet.

According to particular features, during the step of estimating time lapse, the client estimates said time lapse for the packets possessing each type of payload, on the basis of the time lapses between the reception of two successive packets that are observed for the packets received, when the payload of the first of those two packets received successively possesses said payload type.

According to particular features, during the step of estimating time lapse, the client estimates said time lapse on the basis of the rank of the first packet in the packet burst possessing the same type of payload.

The inventors have, as a matter of fact, determined that all or part of these parameters influences the time lapse that lapses between the reception of two packets by the client.

According to particular features, during the step of triggering and defining retransmission of at least one of said packets, on the basis of said time lapse, the client measures the time lapse that has lapsed since the reception of the first packet and sends a message to the server requesting retransmission of the second packet, if the second packet has not yet been received, on the basis of a comparison between said lapsed time lapse and said estimated time lapse.

According to particular features, during the step of estimating time lapse, the server estimates said time lapse on the basis of the payload type of a first packet to retransmit and of at least one second packet following said first packet to retransmit.

The inventors have, as a matter of fact, determined that all or part of this payload type influences the time lapse that lapses between the sending of two successive packets by the server.

According to particular features, during the step of triggering and defining retransmission of at least one of said packets, on the basis of said time lapse, the server determines a probability of losing at least one second packet to transmit on the basis of its payload type, knowing that the first packet has been lost.

According to particular features, during the step of triggering and defining retransmission of at least one of said packets, on the basis of said time lapse, the server determines a probability of losing at least one second packet to transmit on the basis of the payload type of the first packet to retransmit, knowing that the first packet has been lost.

According to particular features, said probability takes into account a loss model.

According to particular features, said loss model takes into account a memory effect of the transmission channel between said server and said client.

According to particular features, said loss model takes into account different parameter values for the packets having different payload types.

According to particular features, said parameter values are determined on the basis of data transmitted by the client.

According to particular features, during the step of triggering and defining retransmission, the server determines a number of packets to transmit with the first packet to retransmit on the basis of their conjoint loss probability.

By virtue of the use of these probabilities, and possibly of these models and parameters, the retransmission of at least one second packet is optimized.

According to a second aspect, the present invention concerns a device for transmitting data packets from a server to at least one client, that comprises:
  a means for estimating a time lapse between the transmission of a successive first and second packet, on the basis of information relating to the first packet and
  a means for triggering and for defining retransmission of the second packet, on the basis of said time lapse.

According to particular features, the means for triggering and defining retransmission is incorporated into the client, and said device comprises:
  a means for measuring the time lapse that has lapsed since the reception of the first packet;
  a means for comparing the measured time lapse and a value representing the estimated time lapse; and
  a means for sending, to the server, a message requesting retransmission of the second packet on the basis of the result provided by the comparing means, if the second packet has not yet been received.

According to particular features, the time lapse estimating means is incorporated into the server, and the device comprises:
  a means for determining a loss probability of the second packet knowing that the first packet has been lost, termed conjoint loss probability, on the basis of the estimated time lapse; and
  a means for retransmitting the second packet to the client on the basis of the determined conjoint loss probability.

According to a third aspect, the present invention concerns a computer program loadable into a computer system, said program containing instructions enabling the implementation of the transmission method of the present invention as succinctly set forth above.

According to a fourth aspect, the present invention concerns an information carrier readable by a computer or a microprocessor, removable or not, storing instructions of a computer program, characterized in that it enables the implementation of the transmission method of the present invention as succinctly set forth above.

As the advantages, objects and features of this transmission device, of this computer program and of this information carrier are similar to those of the transmission method of the present invention, as succinctly set forth above, they are not reviewed here.

Other advantages, objects and features of the present invention will emerge from the following description, given, with an explanatory purpose that is in no way limiting, with respect to the accompanying drawings.

DETAILED DESCRIPTION

In the following description, first of all of two particular embodiments of the transmission method of the present invention will be described, the first, illustrated in FIGS. 2, 3 and 7, being adapted to be implemented on the client end, the second, illustrated in FIGS. 2 and 4 to 7, being adapted to be implemented on the server end. These first two embodiments may be implemented independently or together, the latter combination improving the efficiency of the transmission all the more. With reference to FIG. 8, a third embodiment is described in which the server and the client each perform steps improving the reactivity of the retransmission system.

It is noted here that the electronic system which supplies data is termed "server", whatever its form, even if it is not based on a server in the computing sense. Similarly, the electronic system which receives the data from the server is termed "client". Thus, a client may be a server in a second transmission of data.

In the drawings, only one client has been represented. However, the present invention is not limited to the case in which the server only transmits data to a single client but extends, quite to the contrary, to the case in which several clients are recipients of data sent by the server.

In the following portion of the description, the transmission is considered of video data coded in accordance with H.264 coding or SVC over a local network or LAN (acronym for "local area network"), by RTP packets.

Figure 2:
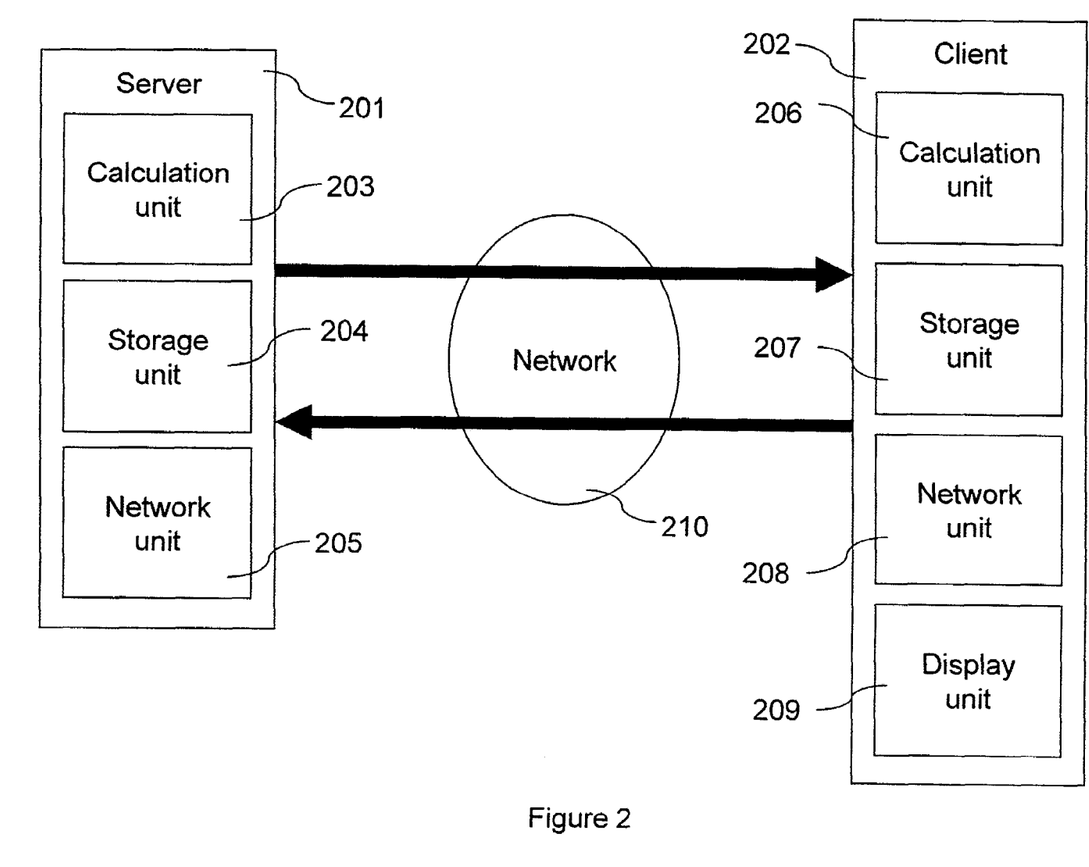
FIG. 2 is a diagram of a client/server pair during the transmission of data from the server to the client.

As can be seen in FIG. 2, to implement the method of the present invention, a server 201 and a client 202 communicate via a network 210. The server 201 comprises in particular a calculation unit 203, a storage unit 204 and a network unit 205. The calculation unit 203 performs the calculations necessary for putting the data to transmit into form, according to the video coding used, and, furthermore, implements the programs stored by the storage unit 204. The storage unit 204 stores a program implementing the method of the present invention and, in particular the steps illustrated in FIG. 4, and, furthermore, stores video data to transmit, prior to and after processing by the calculation unit 203. The network unit 205 performs the transmission and any retransmission over the network 210, of the packets comprising the video data to transmit, and, furthermore, receives messages from the client 202, in particular acknowledgement of receipt messages, be they positive "ACK" or negative, "NACK".

The server 201 is capable of regulating the bitrate of the video data, to match it to the bandwidth available on the network 210. This bandwidth is estimated thanks to information coming from the client 202, via RTCP packets (RTCP being an acronym for "Real Time Transport Control Protocol"), by implementing a TFRC algorithm (TFRC being an acronym for "TCP friendly rate control"). Furthermore, the server 201 is capable of retransmitting packets when it receives a NACK negative acknowledgement of receipt.

Possibly, a source of video data (not represented), such as a video camera, may be added, the calculation unit 203 then also performing the compression of the video data coming from that source of video data.

The client 202 comprises a calculation unit 206, a storage unit 207, a network unit 208 and a display unit 209. The calculation unit 206 performs the calculations necessary for the decoding of the data received from the server 201, according to the video coding used, and, furthermore, implements the programs stored by the storage unit 207. The storage unit 207 stores a program implementing the method of the present invention and, in particular the steps illustrated in FIG. 3, and, furthermore, stores video data received, prior to and after processing by the calculation unit 206. The network unit 208 receives, from the server 210, packets comprising the video data transmitted by the server 201, and, furthermore, sends messages to the server 201, in particular acknowledgement of receipt messages, be they positive "ACK" or negative, "NACK". The display unit 209 is adapted to display the images which are supplied to it by the calculation unit 206.

The inventors have determined that the time lapse of the period between the moments of transmission, and thus of reception when no problem arises, of two successive packets depends on the content type and, in particular, on the payload type of at least one of those packets. In particular, when two successive packets transport data of the same image, the time lapse between arrivals of successive packets, or "PIAT" ("packet inter arrival time") is generally shorter than the analogous time lapse for successive packets transporting data of different images, or slices. Indeed, when an image comprises a quantity of data requiring its fragmentation, the resulting packets are sent in bursts to ensure that their arrival is as simultaneous as possible. On the other hand, successive packets transporting data from different images, or slices, are generally sent according to the rhythm of the frames.

In the case of H.264 coding and SVC, the fragmented image data are transported in packets of FU type. The non-fragmented image data are transported in packets of STAP or MTAP type.

The present invention implements this particularity to determine, at the client end, when the client may consider that a packet is lost and request its retransmission, and at the server end, how many packets must be retransmitted.

Figure 3:
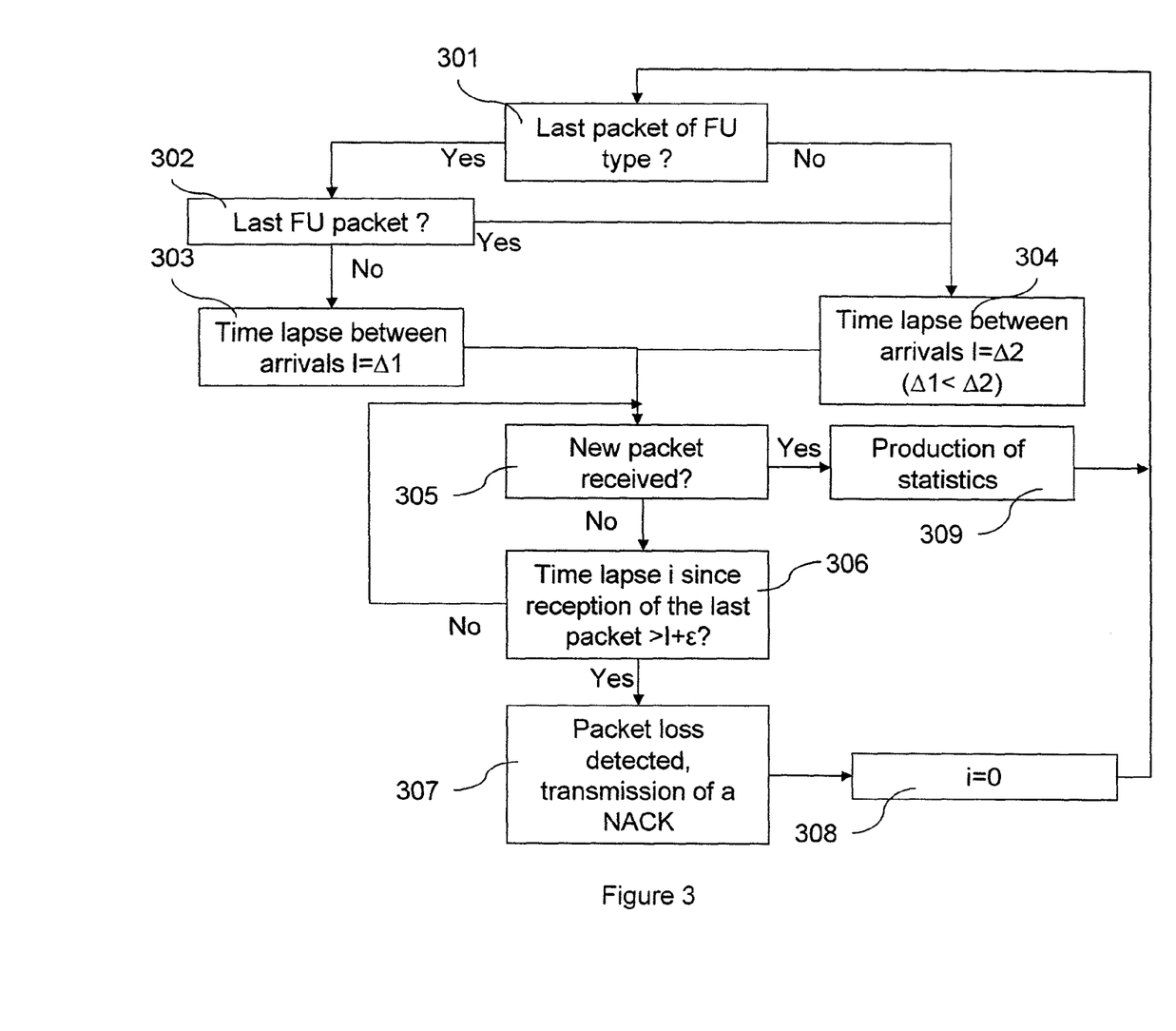
FIG. 3 represents, in logigram form, steps implemented by a client, in a first embodiment of the method of the present invention.

As regards the first embodiment of the method of the present invention, implemented at the client end, as illustrated in FIG. 3, commencement is made by a step 301, during which the client determines whether the last packet received if of "FU" type. If not, the client proceeds to a step 304. If yes, during a step 302, the client determines whether that last received packet is the last of a burst of FU packets, that is to say the last which transports image data from the same image. Step 303 consists of determining, in the second byte of the FU packet header, whether the flag "E" has the value "1". If yes, it is the last FU packet of a burst of FU packets.

If the result of step 302 is positive, the client proceeds to step 304. Otherwise, during a step 303, the client determines that the normal time lapse I between the moment of arrival of the last packet received and the moment of arrival of the following packet is a first predetermined time lapse $\Delta 1$. On the other hand, during the step 304, the client determines that the normal time lapse I between the moment of arrival of the last packet received and the moment of arrival of the following packet is a second predetermined $\Delta 2$ greater than the first predetermined time lapse $\Delta 1$.

Further to one of the steps 303 or 304, during a step 305, the client determines whether a new packet has been received. If yes, the client performs a step 309 of producing statistics. These statistics concern, in particular, the period lapsed between the reception of the first packet during the step 301 and the reception of the second packet, during the step 305, when the first packets have payloads of "FU" type, on the one hand, and when the first packets have payloads of "STAP" or "MTAP" type, on the other hand. On the basis of these statistics, the values of the first predetermined time lapse Δ1 and second predetermined time lapse Δ2 are determined, for example in order for them to encompass the waiting period for 90% of the second packets of each type that have already arrived.

It is noted that when the same second packet, whose retransmission has been requested by the client, is received twice, the statistics only take into account the time lapse between the reception of the first packet and the first reception of the second packet.

Figure 4:
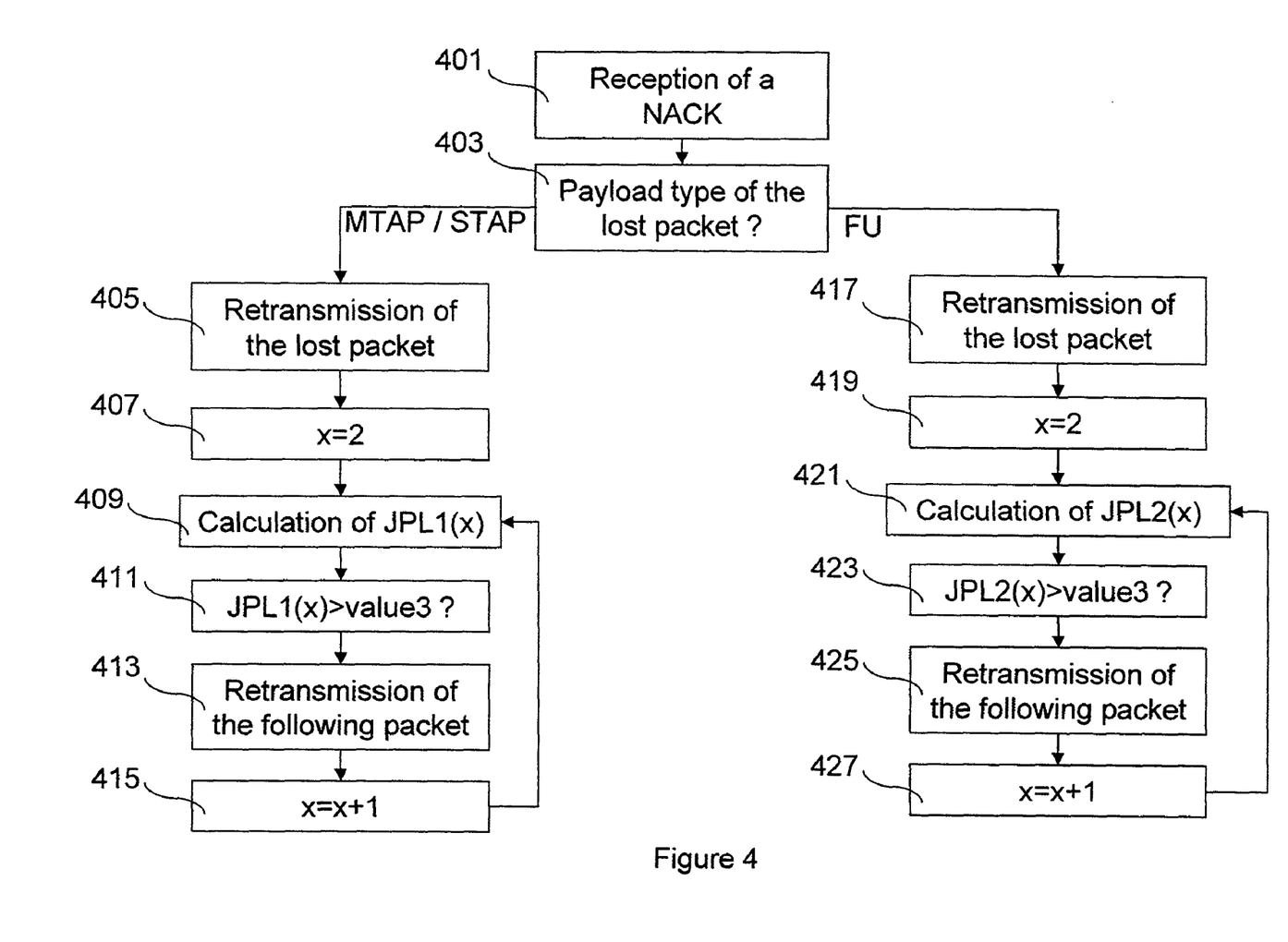
FIG. 4 represents, in logigram form, steps implemented by a server, in a second embodiment of the of the method present invention.

It is also noted that, during the step 309, the client establishes, the case arising, the parameter values for the model implemented by the server, when the server implements the second embodiment of the method illustrated in FIG. 4.

Further to step 309, the client returns to step 301, the new packet received then being considered as the last packet received.

If the result of step 305 is negative, during a step 306, the client determines whether the time lapse i lapsed since the reception of the last packet is greater than the predetermined time lapse I to which the client has added a predetermined margin of error ε.

If not, the client reiterates step 305. If yes, during a step 307, the client considers that the awaited packet is lost and sends a negative acknowledgement of receipt or "NACK" to the server, which identifies by its sequential number the awaited packet by incrementing the number of the last packet received. Next, during a step 308, the client reinitializes to the present time, the time as from which the time lapse i is measured and returns to step 301.

It is to be noted that the values of the first and second predetermined time lapses are preferentially defined on the basis of the time lapses between the reception of two successive packets observed for the received packets, respectively when the payload of the first of these two successively received packets is of FU type and when the payload of the first of these two successively received packets is of STAP or MTAP type.

In the second particular embodiment of the method of the present invention, illustrated in FIG. 4, a characteristic of a memory effect of the packet loss process in a network is used. It is to be recalled here that the memory effect of the channel is that if a packet is lost, the risks of packet loss for each of the following packets are increased. The length of the channel memory characterizes the duration of the influence of the loss of a packet on the following packets. As a consequence of this memory effect, packet losses occur in groups. The second embodiment of the present invention exploits this knowledge to improve the reactivity of the ARQ retransmission process. Since losses occur in groups, if the server is informed of a loss, it can determine the risk of one or more packets that follow, in their sequential order, being lost too. Furthermore, as the packets of FU type are transmitted by bursts, they have a probability of being lost conjointly (termed "conjoint probability") that is higher than for the packets of STAP or MTAP type which follow the rhythm of the frames.

In the second embodiment illustrated in FIG. 4, during a step 401, the server receives first of all a negative acknowl-edgement of receipt, or "NACK". Next, during a step 402, the server determines the type of payload of the packet identified in the negative acknowledgement of receipt received.

If it is a MTAP or STAP type of payload, the server retransmits the lost packet during a step 405. Then, during a step 407, the server initializes the value of a variable x to "2". The variable x represents the length of the memory of the transmission channel.

Next, during a step 409, an estimation is made of conjoint loss probability of the lost packet and the $x-1^{th}$ following packets If the channel is modeled by a Bernouilli model, which does not take memory effect into account, the conjoint loss probability of losing x consecutive packets is given by the formula $$JLP(x)=P^x$$

where P is the probability of loss of a packet.

Figure 5:
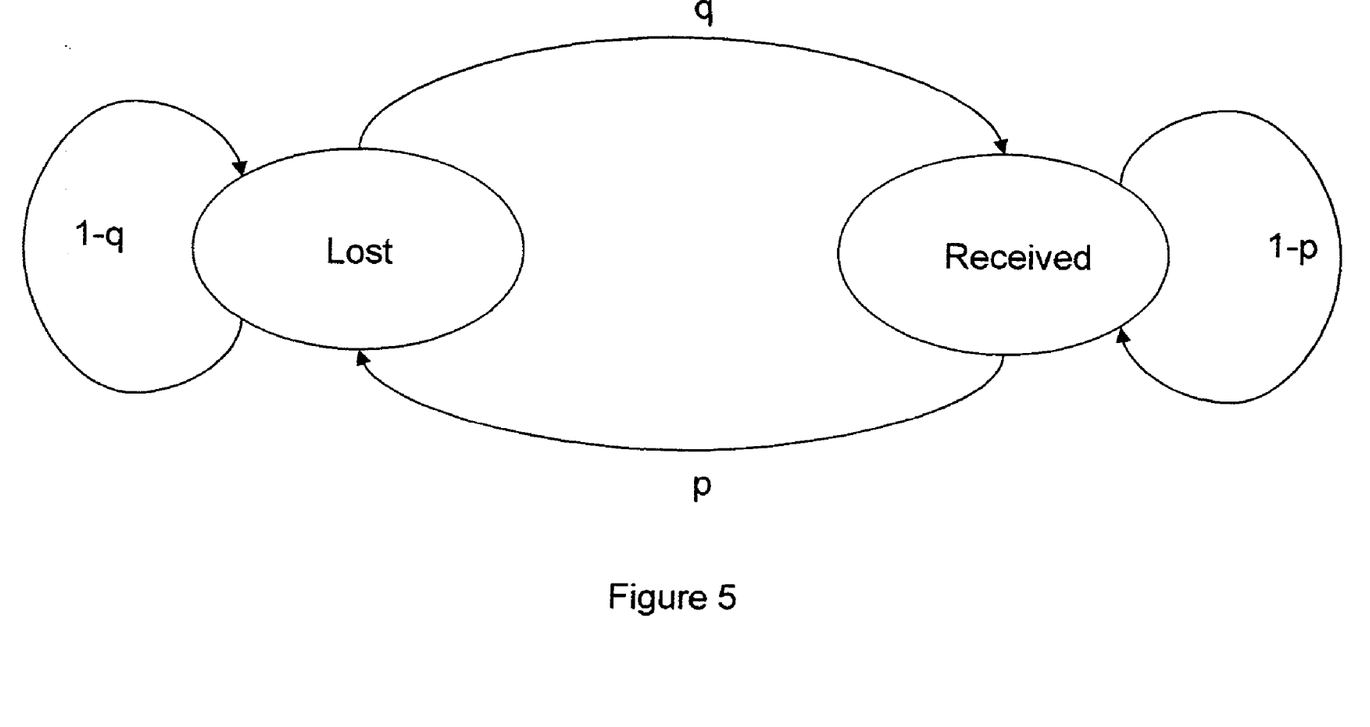
FIG. 5 is a diagram of a model of packet loss over a transmission network.

However, the channel memory is better modeled by the model known by the name of "Elliott-Gilbert", which is a Markov model with two states illustrated in FIG. 5. This model uses two parameters, "p" and "q", "p" being the probability of passing from the state "received" to the state "lost" and "q" being the probability of passing from the state "lost" to the state "received". Consequently, 1−p is the probability of remaining in the "received" state and 1−q is the probability of remaining in the state "lost".

According to this model, the probability of losing x successive packets is given by the formula $$JLP(x)=p(1-q)^{x-1}$$

The values of P, p and q are calculated by the client (see step 309 of FIG. 3) and transmitted to the server by RTCP proprietary packets.

It is to be noted, however, that in the present case, the client distinguishes between events occurring with respect to packets having an STAP or MTAP type payload, and packets having an FU type payload. Consequently, two sets of loss model parameters are transmitted to the server, one of them ($P_{FU}$, $p_{FU}$ and $q_{Fu}$) for the packets with FU type payload and the other ($P_{AP}$, $p_{AP}$ and $q_{AP}$) for the packets of STAP or MTAP type payload.

These different sets of parameter values enable the server to calculate the conjoint probability of losing successive packets JPL adapted to the type of payload of the packets used.

Figure 6:
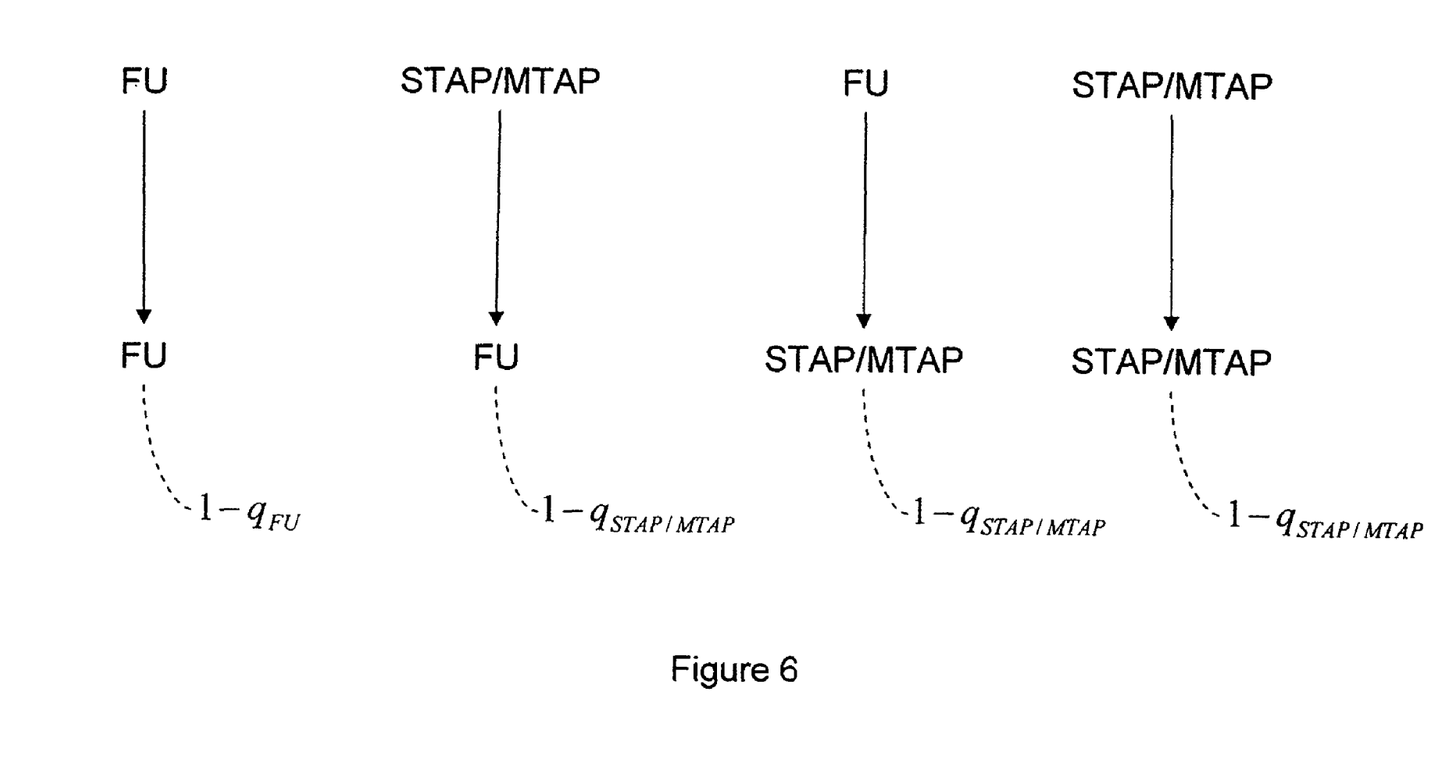
FIG. 6 is a diagram of probabilities implemented in the second embodiment of the method of the present invention.

Consequently, the probability JPL(x) is:

for the Bernouilli model $JPL(x)=P_{FU}^t P_{AP}^k$ where t and k are respectively the number of FU and STAP or MTAP packets in a set of x consecutive packets (t+k=x)

for the Elliott-Gilbert model $JPL(x)=p_{FU or AP}(1-q_{Fu})^y$ $(1-q_{AP})^z$ where y is the number of transitions between the states "FU lost" and "FU lost" (in other words, the number of consecutive packets lost of which the payload is of FU type), z is the number of transitions between the states "FU lost" and "STAP or MTAP lost", "STAP or MTAP lost" and "FU lost" and "STAP or MTAP lost" and "STAP or MTAP lost" (in other words, the number of packet losses not involving the loss of two consecutive packets of which the payload is of FU type), all these transitions being represented in FIG. 6, with y+z=x−1.

The selection between $p_{FU}$ and $p_{AP}$ depends on the packet that is recognized during the step 403. For example, if the lost packet identified is a packet of which the payload is of STAP type and that packet is followed by two packets of which the payload is of FU type, the probability of conjoint loss is $$JPL(3)=p_{AP}(1-q_{AP})(1-q_{FU}).$$

Further to step 409, during a step 411, it is determined whether the value of conjoint probability is greater than a third limit value "value3" which corresponds to a limit value beyond which it is considered that the conjoint retransmission of the x packets following the lost packet is efficacious.

If the result of step 411 is positive, during a step 413, it is decided to retransmit the x−1 packets following the lost packet. Next, during a step 415, the value of x is incremented and step 409 is returned to.

If the result of step 411 is negative, the retransmission decided on earlier is carried out and step 401 is returned to.

If, during the step 403, only the type of payload of the lost packet is determined, steps 417 to 427 are carried out that are respectively identical to the steps 405 to 415, but implementing another set of parameter values, for the probability calculations, as set out above.

Figure 7:
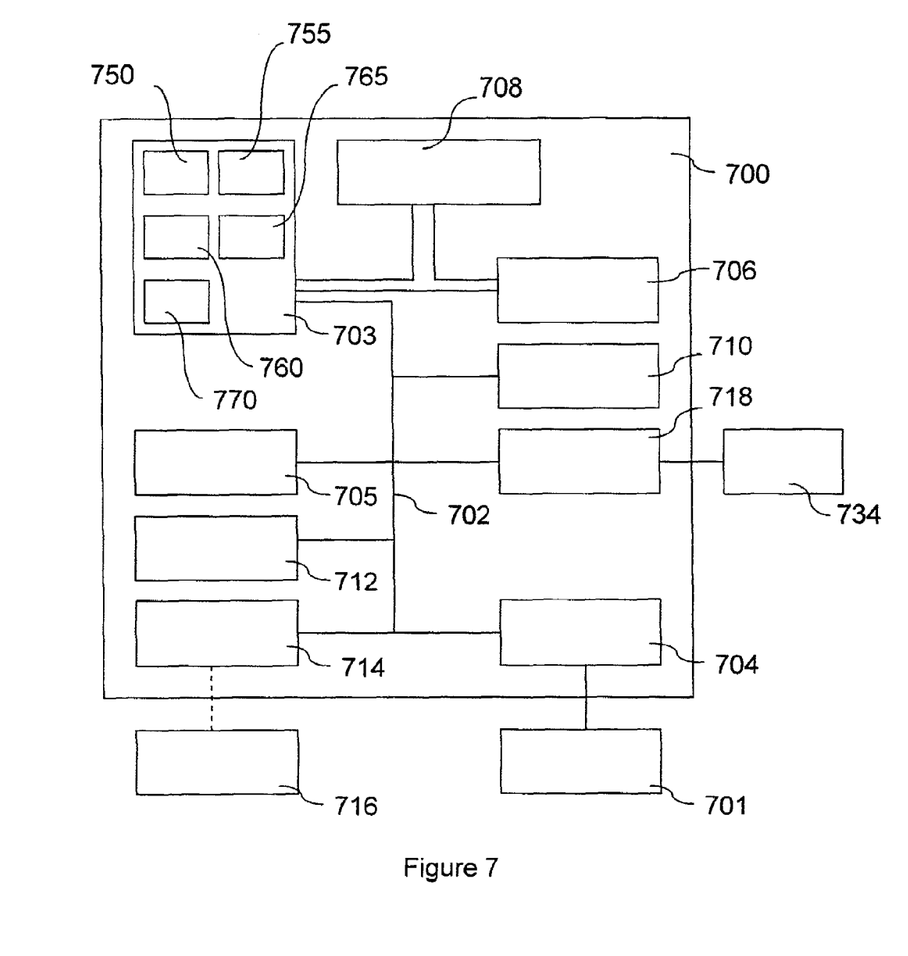
FIG. 7 is a diagram of a particular embodiment of the device of the present invention which may be used as server and as client and FIG. 8 represents, in logigram form, steps implemented in a third embodiment of the of the method present invention.
Figure 8:
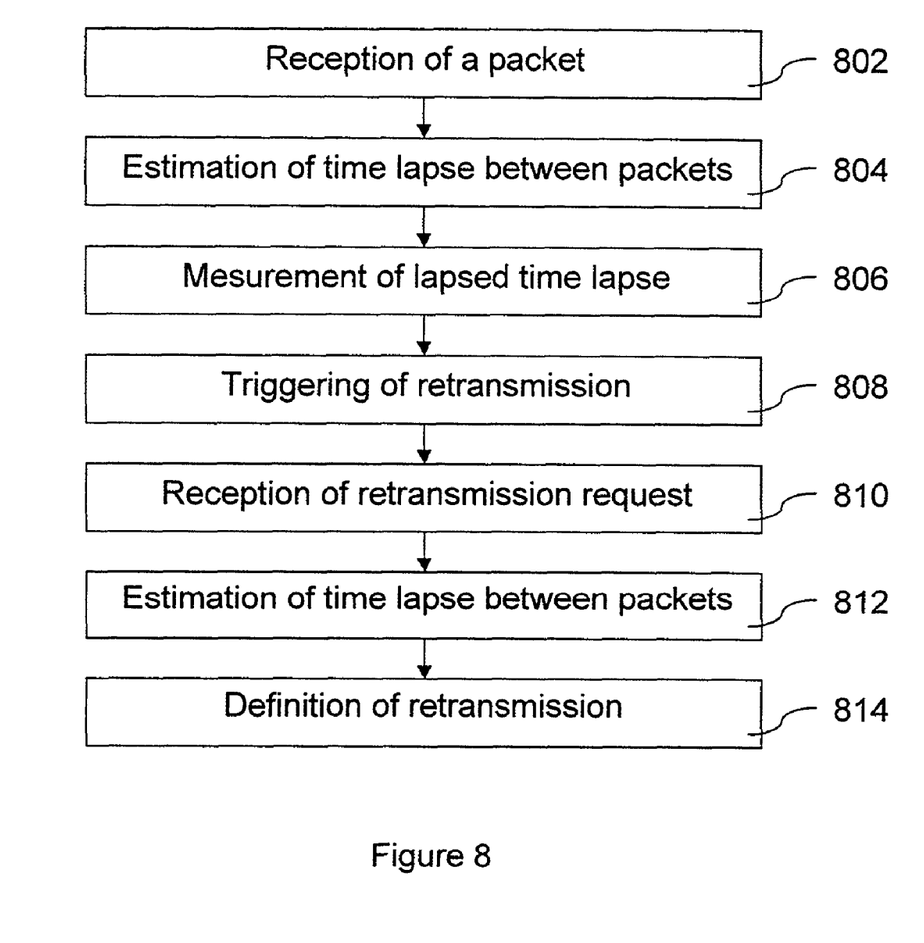

A particular embodiment of the device 700 of the present invention can be seen in FIG. 7, which is able to operate as data server or client receiving data, and different peripherals adapted to implement the present invention. In the embodiment illustrated in FIG. 7, the device 700 is a micro-computer of known type connected, via an input card 704, to a means 701 for acquisition or storage of data, for example video.

The device 700 comprises a communication interface 718 connected to a network 734 suitable for transmitting data, requests and/or acknowledgement of receipt messages.

The device 700 also comprises a storage means 712, for example a hard disk, and a drive 714 for a diskette 716. The diskette 716 and the storage means 712 may contain data to code or decode, video data and a computer program adapted to implement the method of the present invention.

According to a variant, the program enabling the device to implement the present invention is stored in ROM (acronym for "read only memory") 706. In another variant, the program is received via the communication network 734 before being stored.

This same device 700 has a screen 705 for viewing the video data or serving as an interface with the user for parameterizing certain operating modes of the device 700, using a keyboard 710 and/or a mouse for example.

A CPU (acronym for "central processing unit") 703 executes the instructions of the computer program and of programs necessary for its operation, for example an operating system. On powering up of the device 700, the programs stored in a non-volatile memory, for example the read only memory 706, the hard disk 712 or the diskette 716, are transferred into a random access memory RAM 708, which then contains the executable code of the program implementing the method of the present invention as well as registers for storing the variables necessary for its implementation.

Naturally, the diskette 716 may be replaced by any type of removable information carrier, such as a compact disc, memory card or key. More generally, an information storage means, which can be read by a computer or by a microprocessor, integrated or not into the device, and which may possibly be removable, stores a program implementing the coding method of the present invention. A communication bus 702 affords communication between the different elements included in the device 700 or connected to it. The representation, in FIG. 7, of the bus 702 is non-limiting and in particular the central processing unit 703 unit may communicate instructions to any element of the device 700 directly or by means of another element of the device 700.

In FIG. 8, a step 802 of receiving a first packet by a client can be seen. Then, during a step 804, the client performs an estimation of a time lapse between the transmission of the first packet and of the following packet, termed "second" packet in the description of the steps concerning the client "second" packet. In this client context, the transmission concerns the reception of the packets.

In embodiments, such as the one illustrated in FIG. 3, during the step 804 of estimating time lapse, the client estimates the time lapse by estimating a content type of the second packet. In particular, as set out with reference to FIG. 3, the client can estimate the time lapse by estimating a payload type of the second packet. In variants, the content type concerns the type of the data represented by the packet, for example data linked to the protocol for transmission over the network, text data, audio, video or image data.

In the case illustrated in FIG. 3, the client estimates the time lapse on the basis of information relating to the first packet. More particularly, in the embodiment illustrated in FIG. 3, this information is extracted from the first packet and concerns not only the type of payload of the first packet, but also, in the case where the payload type is "FU", the fact of whether or not that first packet is the last packet of a burst of packets relating to the same image or to the same slice, or, which amounts to the same thing, the fact of whether or not the first and second packets transport image data from the same image or the same slice.

In variants, the information extracted from the first packet is information of content or payload type of the second packet. In this last case, information is provided in at least one part of the packets, for example their header or footer, that describes at least the following packet. For example, this information states the number of packets of the packet burst in course of transmission of which the second packet is part.

In embodiments, the client estimates the time lapse on the basis of statistical results, for example, for each type of payload of the first packet, on the basis of time lapses between the reception of two successive packets observed for the packets received, when the payload of the first of those two packets received successively has said payload type.

Next, during a step 806, the client measures the time lapsed from reception of the first packet. During a step 808, the client performs the triggering and/or the definition of a retransmission of at least one packet, on the basis of the estimated time lapse and the measured time lapse. As set out with reference to FIG. 3, when the measured time lapse exceeds the estimated time lapse added to an error margin, the client requires of the server to retransmit the second packet. As a variant, the client indicates how many packets must be retransmitted, in particular if it knows the number of packets remaining to be received for a burst of packets. For example; to require this transmission, the client sends, for each packet to retransmit, a negative acknowledgement of receipt NACK identifying that packet.

During a step 810, the server carries out reception of a first packet by a client. Next, during a step 812, the server performs an estimation of a time lapse between the transmission of the packet whose retransmission is requested by the client, which, in the description of the steps concerning the server, is termed "first packet", and the transmission of the following packet, which, in the description of the steps concerning the server, is termed "second packet". In this server context, the transmission concerns the sending of the packets.

In embodiments, such as the one illustrated in FIG. 4, during the step 812 of estimating time lapse, the server estimates the time lapse by estimating a content type of the second packet. In particular, as set out with reference to FIG.

4, the client can estimate the time lapse by estimating a payload type of at least one of the first and second packets. In variants, the content type concerns the type of data represented by the packet, for example data linked to the protocol for transmission over the network, text data, audio, video or image data, the payload type of the packet and, where the payload type is "FU", the fact of whether or not that first packet is the last packet of a burst of packets relating to the same image or, which amounts to the same thing, the fact of whether or not the first and second packets transport image data of the same image.

In variants, the time lapse is estimated on the basis of priority information of the packet.

Then, during a step 814, the server performs a step of triggering and transmission definition of at least one second packet, on the basis of the estimated the time lapse. In the embodiment illustrated in FIG. 4, during the step of triggering and defining retransmission of at least one of said packets, on the basis of said estimated time lapse, the server determines a conjoint probability of losing at least one second packet to transmit on the basis of the payload type of the first packet and of the following packets, knowing that the first packet has been lost. Then, on the basis of that conjoint probability, the server determines the number of following packets to retransmit with the first packet.

In variants, this probability is replaced by a table linking the packet types, for example defined by their payload type, their content or their priority, with the number of following packets to retransmit with the first packet.

As a variant, applicable both to the embodiment illustrated in FIG. 4 and to that illustrated in FIG. 8, the use by the server of the reception of a packet retransmission request, in particular of a negative acknowledgement of receipt "NACK", is replaced by a time lapse for awaiting an acknowledgement of receipt. Thus, if the server does not receive any acknowledgement of receipt within a period of a predetermined time lapse after sending a packet, it considers that the packet has been lost and performs the retransmission steps of the method of the present invention.

The invention claimed is:

1. A method of transmitting data packets from a server to at least one client, comprising:
    an estimating step of estimating a time lapse between the transmission of a successive first and second packet, on the basis of information relating to the first packet, said information being representative of whether or not the first and second packets transport image data from the same image; and
    a step of triggering and of defining retransmission of the second packet, on the basis of said time lapse.

2. A method according to claim 1, wherein the information relating to the first packet represents a content type of the second packet and, during the estimating step, the time lapse between the transmission of the first and second successive packets is estimated on the basis of the content type of the second packet.

3. A method according to claim 1, wherein the information relating to the first packet represents a content type of the first packet and, during the estimating step the time lapse between the transmission of the first and second successive packets is estimated on the basis of the content type of the first packet.

4. A method according to claim 1, wherein said data packets comprise video data and the information relating to the first packet represents a fragmentation between at least first and second packets of video data corresponding to the same moment in time.

5. A method according to claim 1, wherein, during the estimating step, the client estimates said time lapse on the basis of the type of the first packet and on the basis of statistical results concerning the time lapse between the reception of the first and second packets on the basis of the content type of the first packet.

6. A method according to claim 1, wherein, during the estimating step, the client estimates said time lapse for the packets possessing each type of payload, on the basis of the time lapses between the reception of two successive packets that are observed for the packets received, when the payload of the first of those two packets received successively possesses said payload type.

7. A method according to claim 1, wherein, during the estimating step, the client estimates said time lapse on the basis of a rank of the first packet in a packet burst possessing the same type of payload.

8. A method according to claim 5, wherein, during the step of triggering and defining retransmission of at least one of said packets, on the basis of said estimated time lapse, the client measures the time lapse that has lapsed since the reception of the first packet and sends a message to the server requesting retransmission of the second packet, if the second packet has not yet been received, on the basis of a comparison between said lapsed time lapse and said estimated time lapse.

9. A method according to claim 1, wherein, during the estimating step, the server estimates said time lapse on the basis of the payload type of a first packet to retransmit and of at least one second packet following said first packet to retransmit.

10. A method according to claim 9, wherein, during the step of triggering and defining retransmission of at least one of said packets, on the basis of said estimated time lapse, the server determines a probability of losing at least one second packet to transmit on the basis of its payload type, knowing that the first packet has been lost.

11. A method according to claim 9, wherein, during the step of triggering and defining retransmission of at least one of said packets, on the basis of said time lapse, the server determines a probability of losing at least one second packet to transmit on the basis of the payload type of the first packet to retransmit, knowing that the first packet has been lost.

12. A method according to claim 9, wherein said probability takes into account a loss model.

13. A method according to claim 12, wherein said loss model takes into account a memory effect of the transmission channel between said server and said client.

14. A method according to claim 12, wherein said loss model takes into account different parameter values for the packets having different payload types.

15. A method according to claim 14, wherein said parameter values are determined on the basis of data transmitted by the client.

16. A method according to claim 9, wherein, during the step of triggering and defining retransmission, the server determines a number of packets to transmit with the first packet to retransmit on the basis of their conjoint loss probability.

17. A device for transmitting data packets from a server to at least one client, comprising:
    a processor;
    estimating means for estimating a time lapse between the transmission of a successive first and second packet, on the basis of information relating to the first packet, said information being representative of whether or not the first and second packets transport image data from the same image; and means for triggering and for defining retransmission of the second packet, on the basis of said time lapse.

18. A device according to claim 17, wherein the means for triggering and defining retransmission is incorporated into the client, and said device further comprises:
    measuring means for measuring the time lapse that has lapsed since the reception of the first packet;
    comparing means for comparing the measured time lapse and a value representing the estimated time lapse; and
    sending means for sending, to the server, a message requesting retransmission of the second packet on the basis of the result provided by the comparing means, if the second packet has not yet been received.

19. A device according to claim 17, wherein the estimating means for estimating time lapse is incorporated into the server, and said device further comprises:
    determining means for determining a loss probability of the second packet knowing that the first packet has been lost, termed conjoint loss probability, on the basis of the estimated time lapse; and
    retransmitting means for retransmitting the second packet to the client on the basis of the determined conjoint loss probability.

20. A non-transitory computer-readable storage medium on which is recorded code of a computer program that can be loaded into a computer system, said program containing instructions enabling the implementation of a method of transmitting data packets from a server to at least one client, comprising:
    an estimating step of estimating a time lapse between the transmission of a successive first and second packet, on the basis of information relating to the first packet, said information being representative of whether or not the first and second packets transport image data from the same image; and
    a step of triggering and of defining retransmission of the second packet, on the basis of said time lapse.

* * * * *